(12) United States Patent
Willis et al.

(10) Patent No.: US 7,671,865 B2
(45) Date of Patent: *Mar. 2, 2010

(54) REFRESH OF DISPLAY

(75) Inventors: Thomas E. Willis, Mountain View, CA (US); Steven L. Midford, Portland, OR (US)

(73) Assignee: Intel Corporation, Santa Clara, CA (US)

(*) Notice: Subject to any disclaimer, the term of this patent is extended or adjusted under 35 U.S.C. 154(b) by 794 days.

This patent is subject to a terminal disclaimer.

(21) Appl. No.: 11/119,664

(22) Filed: May 2, 2005

(65) Prior Publication Data

US 2005/0195208 A1 Sep. 8, 2005

Related U.S. Application Data

(63) Continuation of application No. 10/007,923, filed on Dec. 7, 2001, now Pat. No. 6,888,551.

(51) Int. Cl.
*G09G 5/36* (2006.01)
*G06F 12/10* (2006.01)
*G06F 12/06* (2006.01)

(52) U.S. Cl. ......................... 345/545; 345/568; 345/571

(58) Field of Classification Search ................. 345/545, 345/536–539, 561, 568, 571
See application file for complete search history.

(56) References Cited

U.S. PATENT DOCUMENTS

| 4,958,378 | A | | 9/1990 | Bell |
| 5,276,851 | A | | 1/1994 | Thacker et al. |
| 5,471,248 | A | * | 11/1995 | Bhargava et al. ....... 375/240.24 |
| 5,701,270 | A | * | 12/1997 | Mohan Rao ........... 365/230.03 |
| 5,835,082 | A | | 11/1998 | Perego |
| 6,247,084 | B1 | | 6/2001 | Apostol, Jr. et al. |
| 6,888,551 | B2 | | 5/2005 | Willis et al. |
| 6,943,801 | B2 | * | 9/2005 | Rosenberg et al. .......... 345/544 |
| 2002/0085013 | A1 | | 7/2002 | Lippincott |

OTHER PUBLICATIONS

"Duel Positive Edge D Flip Flops with Complementary Output", *Fairchild Semiconductor*, www.fairchildsemi.com,(Aug. 1986).
"U.S. Appl. No. 10/007,923, Advisory Action mailed Apr. 14, 2004", 3 pgs.
"U.S. Appl. No. 10/007,923, Final Office Action mailed Jan. 29, 2004", 18 pgs.
"U.S. Appl. No. 10/007,923, Non Final Office Action mailed Jul. 28, 2004", 5 pgs.

(Continued)

*Primary Examiner*—Hau H Nguyen
(74) *Attorney, Agent, or Firm*—Schwegman, Lundberg & Woessner, P.A.

(57) ABSTRACT

A method, apparatus, and signal-bearing medium for sending to a display device only those regions of the display screen that change. A frame buffer is divided into tiles, which may be composed of one or more regions, and data in the frame buffer represents pixels on the display screen. When data representing a pixel is modified in the frame buffer, the region or tile associated with the pixel is marked as dirty, and those tiles or regions that are dirty in the frame buffer are written to the display.

15 Claims, 5 Drawing Sheets

OTHER PUBLICATIONS

"U.S. Appl. No. 10/007,923, Non Final Office Action mailed Aug. 19, 2003", 14 pgs.

"U.S. Appl. No. 10/007,923, Notice of Allowance mailed Dec. 17, 2004", 4 pgs.

"U.S. Appl. No. 10/007,923, Response filed Oct. 28, 2004 to Non Final Office Action mailed Jul. 28, 2004", 8 pgs.

"U.S. Appl. No. 10/007,923, Response filed Nov. 19, 2003 to Non Final Office Action mailed Aug. 19, 2003", 15 pgs.

"U.S. Appl. No. 10/007,923, Response filed Mar. 29, 2004 to Final Office Action mailed Jan. 29, 2004", 15 pgs.

"U.S. Appl. No. 10/007,923, Response filed Apr. 29, 2004 to Advisory Action mailed Apr. 14, 2004", 12 pgs.

* cited by examiner

_(1)_

REFRESH OF DISPLAY

This application is a continuation of U.S. application Ser. No. 10/007,923, filed on Dec. 7, 2001, now issued as U.S. Pat. No. 6,888,551, which is incorporated herein by reference.

FIELD

This invention relates generally to display devices and more particularly to displaying information on a display device.

BACKGROUND

Current systems use raster-based display refresh techniques to update their displays. Using this technique, a host computing device transfers the entire displayed contents to the display device at a fixed rate, which is often called the "refresh rate" and is typically 60-85 Hz in prior systems. Each transfer typically moves a frame, also called a screen image, from the host to the display device by tracing the screen image from left-to-right and top-to-bottom on the display screen. This refresh is wasteful unless substantial portions of the screen image change at approximately the refresh rate.

For example, consider a user reading a news story from a web page. The content of the displayed page changes only as the user scrolls through the story; yet, current systems built on raster-refresh techniques expend energy and effort to repeatedly copy the same data, i.e., the screen contents, from the host to the display. This repeated copying inefficiently uses power and bandwidth between the host and the display.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
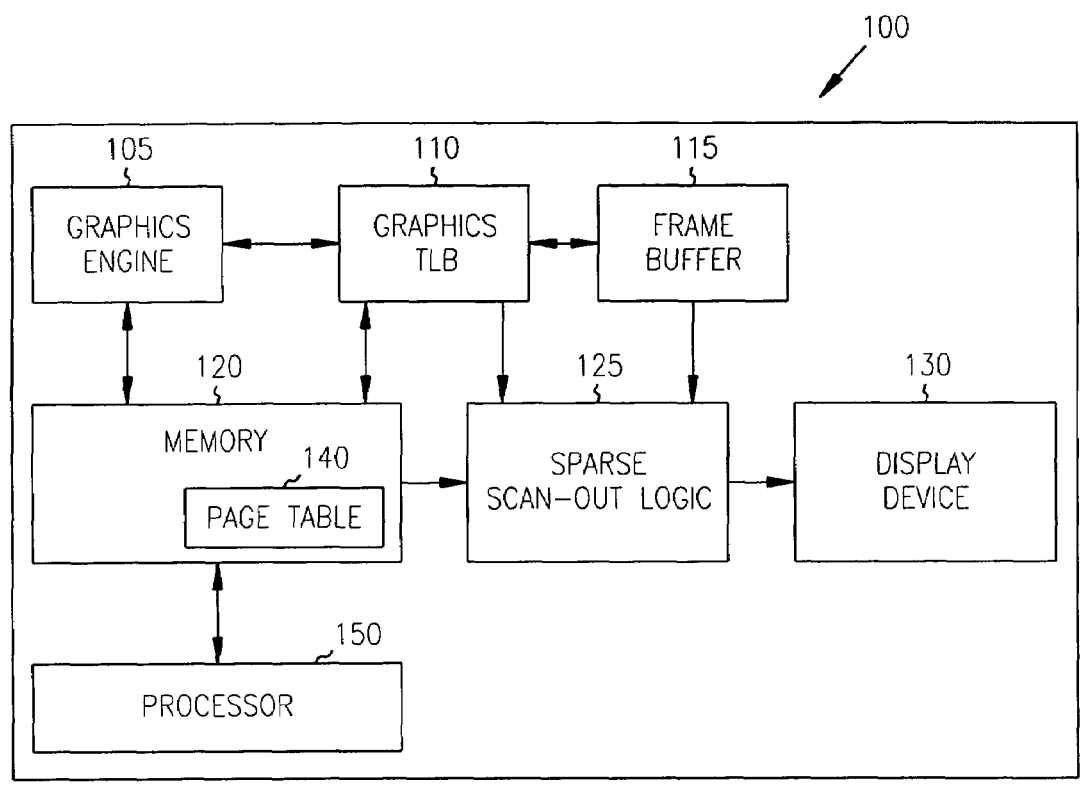
FIG. 1 depicts a block diagram of a computing device for implementing an embodiment of the invention.

FIG. 1 depicts a block diagram of computing device 100 for implementing an embodiment of the invention. Computing device 100 includes graphics engine 105, graphics TLB (translation-lookaside buffer) 110, frame buffer 115, memory 120, sparse scan-out logic 125, display device 130, and processor 150. Computing device 100 may be implemented using any suitable hardware and/or software, such as a personal computer or other computing device available from a number of vendors. But, other examples may be portable computers, network computers, laptop or notebook computers, PDAs (Personal Digital Assistants), mainframe computers, or any other suitable computing devices. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports displaying information on a display device.

Graphics engine 105 generates graphics or text for display on display device 130. Although graphics engine 105 is drawn as being separate from memory 120, in another embodiment graphics engine 105 may be instructions within memory 120 that are executable on processor 150. Although graphics engine 105 is drawn as being part of computing device 100, in another embodiment graphics engine 105 may be external to computing device 100. Graphics engine 105 may be communicatively coupled to graphics TLB 110 and memory 120. Graphics engine 105 is further described below with reference to FIG. 4.

Graphics TLB 110 maps active graphics tiles onto frame buffer 115. Graphics TLB may be communicatively coupled to graphics engine 105, memory 120, frame buffer 115, and sparse scan-out logic 125. Graphics TLB 110 is further described below with reference to FIGS. 3 and 5. Although graphics TLB 110 is drawn as being separate from memory 120, in another embodiment graphics TLB 110 may be a part of memory 120. Although graphics TLB 110 is drawn as being a part of computing device 100, in another embodiment graphics TLB 110 may be external to computing device 100.

Frame buffer 115 is a region of memory that holds the image to be displayed on display device 130. Frame buffer 115 may be comprised of a single plane that contains data for all color components or may be comprised of independent planes that each contain the data for one color component. In another embodiment, frame buffer 115 may contain values that are indexes into a table of colors. In other embodiments, other organizations of frame buffer 115 may be used. Frame buffer 115 may be local to a graphics sub-system or may be shared with other agents, such as processor 150. Although frame buffer 115 is drawn as being separate from memory 120, in another embodiment, frame buffer 115 may be a part of memory 120. Although frame buffer 115 is drawn as being part of computing device 100, in another embodiment frame buffer 115 may be external to computing device 100. In an embodiment, frame buffer 115 may be implemented as an adapter card. Frame buffer 115 may be communicatively coupled to graphics TLB 110 and sparse scan-out logic 125. Example contents of frame buffer 115 are further described below with reference to FIG. 2.

Memory 120 represents one or more mechanisms for storing data. For example, memory 120 may include read only memory (ROM), random access memory (RAM), magnetic disk storage media, optical storage media, flash memory devices, and/or other machine-readable media. Although only one memory device 120 is shown, multiple storage devices and multiple types of storage devices may be present. Further, although computing device 100 drawn to contain memory 120, it may be distributed across other computing devices. Memory 120 may include page table 140, which is further described below with reference to FIG. 5. Of course, memory 120 may also contain additional software and data (not shown), which is not necessary to understanding the invention. Memory 120 may be communicatively coupled to graphics engine 105, graphics TLB 110, sparse scan-out logic 125, and processor 150.

Sparse scan-out logic 125 may include instructions capable of being executed on processor 150 to carry out the functions of the present invention. In another embodiment, some or all of the functions of sparse scan-out logic 125 may be carried out via hardware in lieu of a processor-based system. Sparse scan-out logic 125 may be communicatively coupled to graphics TLB 110, frame buffer 115, memory 120, and display device 130. Sparse scan-out logic 125 is further described below with reference to FIGS. 6 and 7.

Display device 130 communicates information to the user of computing device 100. Display device 130 may be communicatively coupled to sparse scan-out logic 125. Display device 130 may be a cathode-ray tube (CRT) based video display well known in the art of computer hardware. But, in other embodiments display device 130 may be replaced with a liquid crystal display (LCD) based or gas, plasma-based, flat-panel display. In still other embodiments, any appropriate display device may be used. Although only one display device 130 is shown, in other embodiments, any number of display devices of different types or of the same type may be present. Although display device 130 is drawn as part of computing device 100, in other embodiments display device 130 may be external to computing device 100.

Processor 150 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 150 executes instructions and includes that portion of computing device 100 that controls the operation of the computing device. Although not depicted in FIG. 1, processor 150 typically includes a control unit that organizes data and program storage in computer memory and transfers data and other information between the various parts of computing device 100. Processor 150 may be communicatively coupled to memory 120.

Although computing device 100 is shown to contain only a single processor, the present invention applies equally to computing devices that may have multiple processors. Although computing device is drawn to contain processor 150, in other embodiments computing device 100 may contain logic in lieu of a processor-based system.

As will be described in detail below, aspects of an embodiment pertain to specific apparatus and method elements implementable on computing devices. In another embodiment, the invention may be implemented as a program product for use with a computing device. The programs and data structures defining the embodiment may be delivered to a computing device via a variety of signal-bearing media, which include, but are not limited to:

(1) information permanently stored on a non-rewriteable storage medium (e.g., read-only memory devices attached to or within a computing device, such as a CD-ROM readable by a CD-ROM drive, or any other type of non-rewriteable storage medium);

(2) alterable information stored on a rewriteable storage medium (e.g., a hard disk, diskette, tape, random-access memory device, or any other type of rewriteable storage medium); or (3) information conveyed to a computing device by a communications medium, such as through a computer or telephone network accessed via a network adapter, including wireless communications.

Such signal-bearing media, when carrying processor-readable instructions that direct the functions of the present invention and/or data organized in a data structure, represent embodiments of the present invention.

Figure 2:
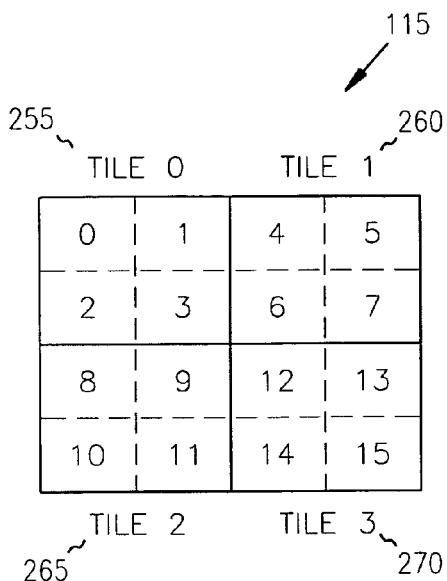
FIG. 2 depicts a block diagram of an example frame buffer using tiled addressing, according to an embodiment of the invention.

FIG. 2 depicts a block diagram of example contents of frame buffer 115 using tiled addressing, according to an embodiment of the invention. Example contents of frame buffer 115 shows a tiled (or paged) addressing scheme in which the screen of display device 130 is divided into a number of x-pixel by y-pixel areas. The pixels for each area are packed into frame buffer 115 using linear addressing. That is, the first xy pixels in frame buffer 115 correspond to the first area; the second xy pixels correspond to the adjacent area, and so forth. There may be padding between rows within an area and between areas.

FIG. 2 illustrates addressing for a 4-pixel square frame buffer without padding between tiles or rows. Each square corresponds to a pixel on display device 130, and the number in each square indicates the position in frame buffer 115. The solid lines indicate the tile boundaries and the dashed lines indicate pixel boundaries with the tiles being 2-pixels square. Thus in the example shown, tile 0 (255) contains pixels 0, 1, 2, and 3; while tile 1 (260) contains pixels 4, 5, 6, and 7; tile 2 (265) contains pixels 8, 9, 10, and 11; and tile 3 (270) contains pixels 12, 13, 14, and 15. In another embodiment, the pixels may be represented in another order within the tiles. A tiled organization of frame buffer 115 provides better locality in the reference stream for frame buffer 115 for most drawing operations. Giving the 2-dimensional spatial coherence typical of screen drawing, it is desirable to locate nearby pixels, in both the horizontal and vertical directions, as close as possible within the frame buffer. Tiling achieves this goal for pixels in the same tile.

Although the example of FIG. 2 is drawn to contain four tiles with four pixels each, in other embodiments any number of tiles and pixels may be present. Although the example of FIG. 2 is drawn with tiles having a square shape, in other embodiments any tile shapes may be used. Although the example of FIG. 2 is drawn with contiguous tiles, in other embodiments, the tiles need not be contiguous. Although FIG. 2 is drawn with each of the tiles having the same number of pixels, in other embodiments some or all of the tiles may contain a different number of pixels.

Figure 3:
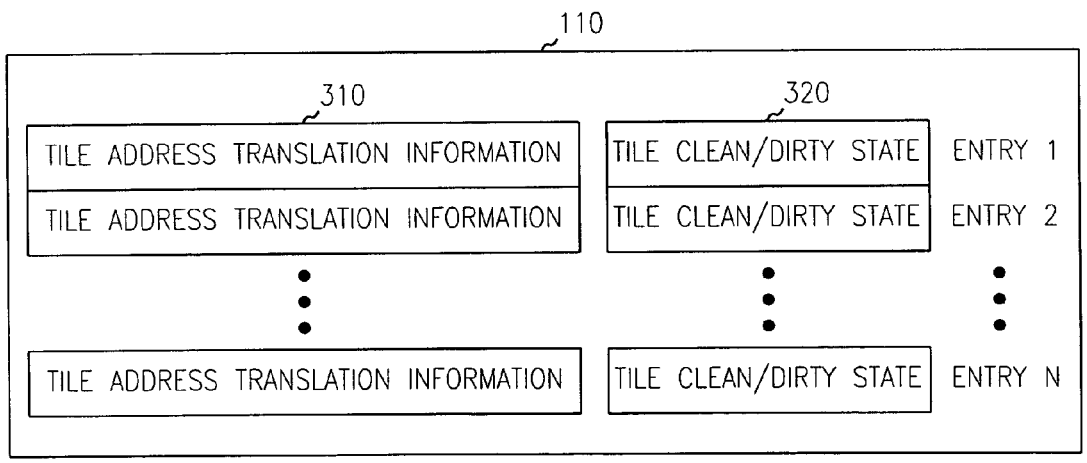
FIG. 3 depicts a block diagram of an example graphics TLB (translation-lookaside buffer), according to an embodiment of the invention.

FIG. 3 depicts a block diagram of example contents of graphics TLB (translation-lookaside buffer) 110, according to an embodiment of the invention. Graphics TLB 110 contains an entry for each tile within frame buffer 115. Although "n" entries are shown in FIG. 3, in other embodiments any number of entries may be present. Each entry in graphics TLB 110 includes tile address translation information field 310 and tile state field 320. Tile address translation information 310 includes a mapping of pixels to tiles, so that for a given pixel its associated tile can be determined. Tile state 320 indicates whether the tile in frame buffer 115 that is associated with the entry is clean (unmodified) or dirty (modified). A tile is clean (unmodified) when all pixels within the tile in frame buffer 115 that have been modified have been written to display device 130. A tile is dirty (modified) when at least one pixel within the tile in frame buffer 115 has been modified but has not been written to display device 130. An entry is added to graphics TLB 110 when information regarding the translation of a pixel to a tile is needed.

Tiles may be divided into regions, where each tile contains m regions where m is an integer. In an embodiment, there is a 1:1 mapping (m=1) between regions and tiles, that is, "region" and "tile" are synonymous. In another embodiment, m is an integer greater than one, that is, each tile contains multiple regions. For the embodiment where m>1, each entry graphics TLB 110 may track the clean/dirty state of the m regions that comprise the tile.

Figure 4:
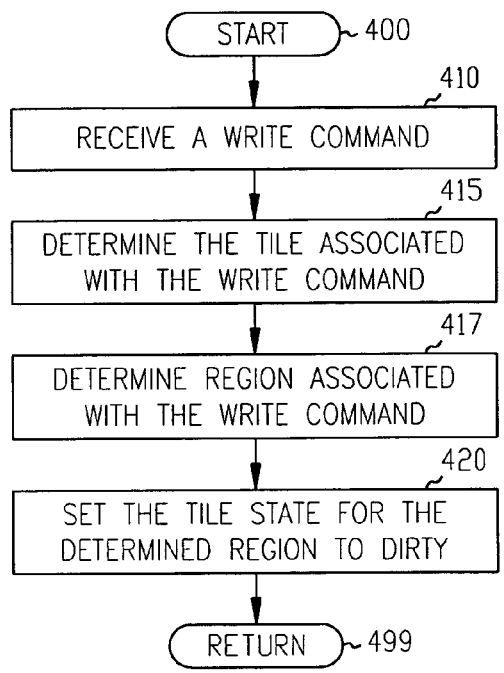
FIG. 4 depicts a flowchart of example processing for a write command, according to an embodiment of the invention.

FIG. 4 depicts a flowchart of processing for a frame buffer write command, according to an embodiment of the invention. Control begins at block 400. Control then continues to block 410 where graphics engine 105 receives a frame buffer write command. Control then continues to block 415 where graphics engine 105 determines the tile associated with the frame buffer write command by interrogating tile address translation information 310 in graphics TLB 110. Control then continues to block 417 where graphics engine 105 where graphics TLB 110 determines which of the m regions are modified by the frame buffer write. For the embodiment where m=1, the determined region in block 417 is the same as the determined tile in block 415. Control then continues to block 420 where graphics engine 105 sets tile state 320 to be dirty for the region entry in graphics TLB 110 associated with the region previously determined in block 417. Control then continues to block 499 where the function returns.

Figure 5:
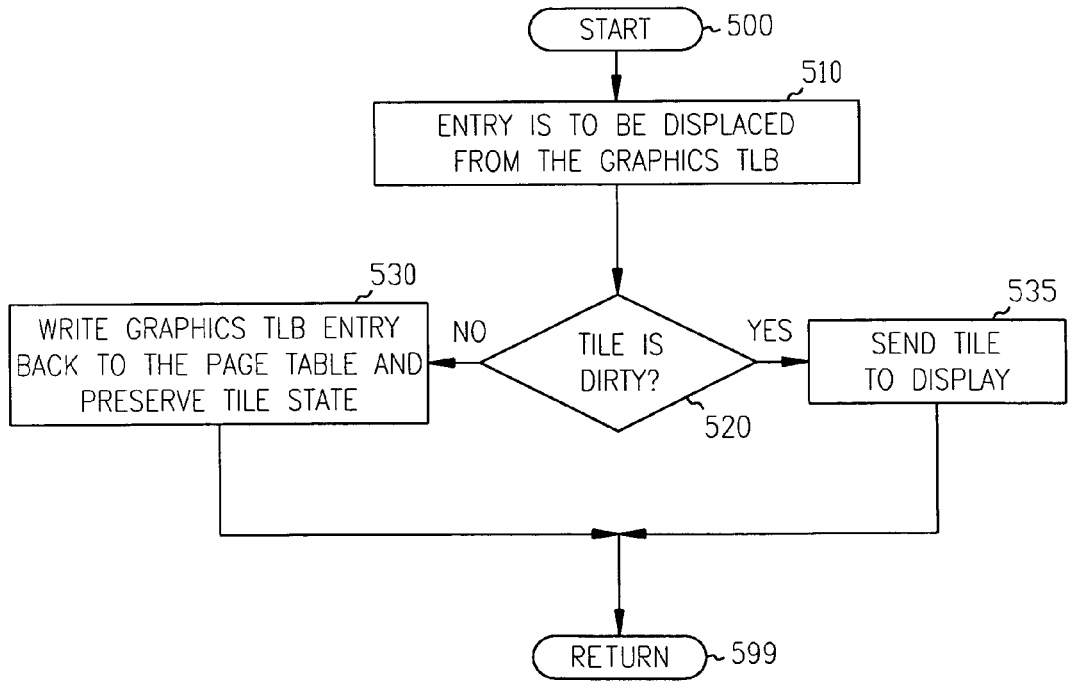
FIG. 5 depicts a flowchart of example processing displacing entries from the graphics TLB, according to an embodiment of the invention.

FIG. 5 depicts a flowchart of processing for displacing entries from graphics TLB 110, according to an embodiment of the invention. Control begins at block 500. Control then continues to block 510 where a command is received from graphics engine 105 by graphics TLB 110 to displace an entry from graphics TLB 110 to memory 120. Control then continues to block 520 where graphics TLB 110 determines whether tile state 320 for the entry in graphics TLB 110 indicates that the tile is dirty (modified). If the determination at block 520 is true, then control continues to block 535 where graphics TLB 110 sends the tile from frame buffer 115 that is associated with the entry in graphics TLB 110 to display device 130. In another embodiment TLB sends only the region or regions that are dirty to display device 130. In another embodiment, instead of sending the tile immediately to display device 130, TLB 110 stores the tile in memory 120 and sends it to display device 130 at a later time. Control then continues to block 599 where the function returns.

If the determination at block 520 is false, then control continues to block 530 where graphics TLB 110 writes the entry in graphics TLB 110 to page table 140, including preserving tile state 320. Control then continues to block 599 where the function returns.

Figure 6:
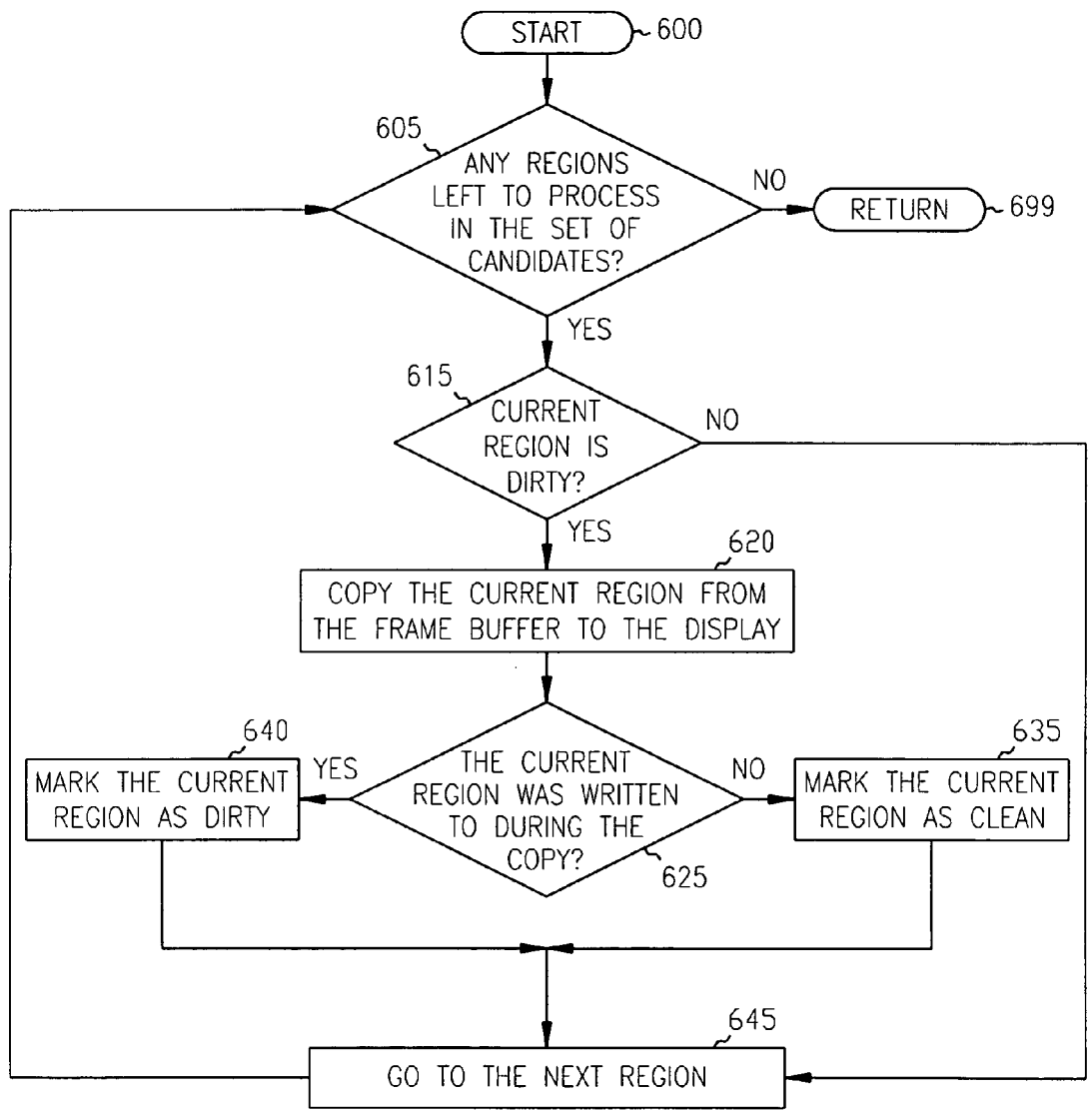
FIG. 6 depicts a flowchart of example processing for sparse scan-out logic, according to an embodiment of the invention.

FIG. 6 depicts a flowchart of processing for sparse scan-out logic 125, according to an embodiment of the invention.

Control begins at block 600. Control then continues to block 605 where sparse scan-out logic 125 determines whether there are any regions left to process in the set of candidates. The sparse scan-out logic of FIG. 6 may be initiated by an external event, such as graphics TLB 110 displacing an entry that contains a modified tile from graphics TLB 110 (in which case the set of candidates contains the displaced graphics TLB entries) or a periodic scan of the graphics TLB 110 and/or page table 140 for modified tiles, in which case the set of candidates contains all graphics TLB entries that are in the graphics TLB and/or page table 140.

If the determination at block 605 is false, then control continues to block 699 where the logic returns.

If the determination at block 605 is true, then control continues to block 615 where sparse scan-out logic 125 determines whether the current region is dirty (modified) by interrogating tile state 320 associated with the current entry. If the determination at block 615 is false, then control continues to block 645 where sparse scan-out logic 125 moves the current region to the next region. Control then returns to block 605, as previously described below.

If the determination at block 615 is true, then control continues to block 620 where sparse scan-out logic 125 copies the current region from frame buffer 115 to display device 130. Control then continues to block 625 where sparse scan-out logic 125 determines whether the current region in frame buffer 115 was written to during the copy of block 620. If the determination at block 625 is false, then control continues to block 635 where sparse scan-out logic 125 marks tile state 320 associated with the current region to be clean, or unmodified. Control then continues to block 645, as previously described above.

If the determination at block 625 is true, then control continues to block 640 where sparse scan-out logic 125 marks the tile state 320 associated with the current region to be dirty, or modified. The actions of blocks 625 and 645 are necessary because care must be taken when updating tile state 320 because modified regions may be sent to display device 130 asynchronously to graphics operations, so it is possible that a region may be further modified while scan-out logic 125 is copying the region to display device 130. Depending on whether or not the newly modified pixels have been scanned out, these modifications may or may not be reflected in the data sent to display device 130. As a result, sparse scan-out logic 125 only marks a region as clean (unmodified) if there were no writes to the region during the scan-out process. Otherwise, the region is left marked dirty (modified). Control then continues to block 645, as previously described above.

Figure 7:
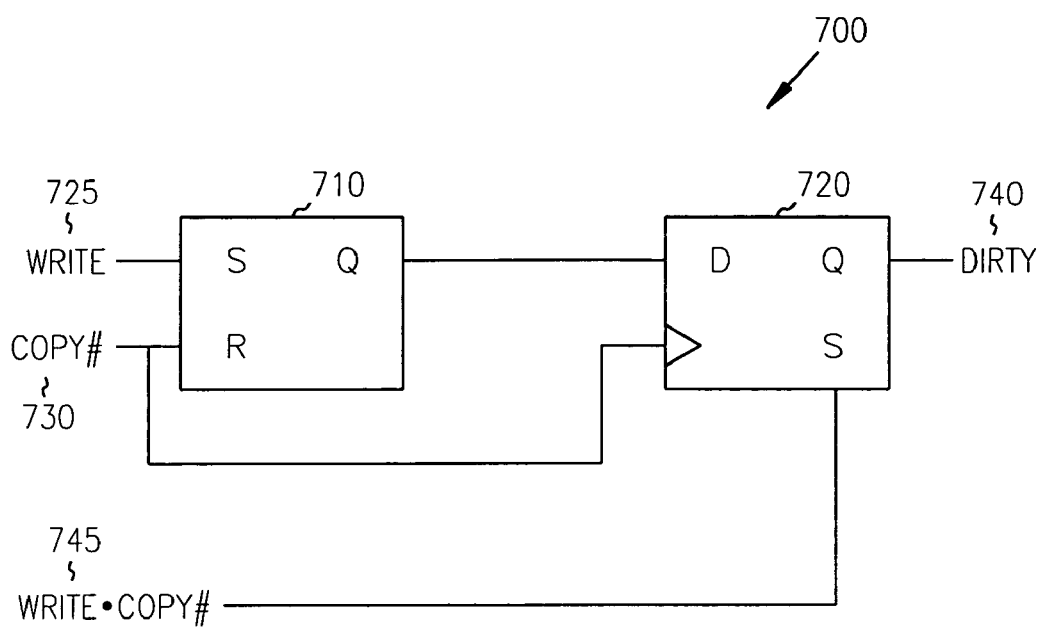
FIG. 7 depicts a block diagram of example sparse scan-out logic, according to an embodiment of the invention.

FIG. 7 depicts a block diagram of example logic 700 for implementing sparse scan-out logic 125, according to an embodiment of the invention. Logic 700 may include set-reset flip-flop 710 communicatively coupled to D-type flip-flop 720. Write 725 is the set input of set-reset flip-flop 710 and may be active (high) when the associated region is modified. Copy# 730 is the reset input of set-reset flip-flop 710 and the clock input to D-type flip-flop 720 and may be active (low) when the region is being copied to display device 130. Copy# is the complement of a copy signal. Dirty 740 is output from D-type flip-flop 720 and indicates whether the region is dirty (modified). The logical-AND 745 of the write and copy# signals is the set input to the D-type flip-flop 720. Logic 700 may be duplicated for each entry in graphics TLB 110. Using standard nomenclature for flip-flops in FIG. 7, "S" indicates set, "R" indicates reset, "Q" indicates output, and "D" indicates data.

What is claimed is:

1. A computer-implemented method, comprising:
    refreshing a display, wherein the refreshing includes,
        determining whether one region of a plurality of regions of a tile in a frame buffer has been modified, wherein the frame buffer comprises information to be displayed on the display, wherein the determining includes using an entry for the region in a storage buffer, and wherein each region includes a plurality of pixels; and after the one region has been modified, copying only the one modified region from the frame buffer to the display, wherein before the one tile is modified, the frame buffer has been divided into the plurality of tiles, each tile including a plurality of regions; and refreshing tiles including a modified region.

2. The computer-implemented method of claim 1, wherein the storage buffer includes information indicating whether the one region has been modified.

3. The method of claim 1, further comprising:

determining whether the region was written-to during the copying; and if the region was written-to during the copying, marking the tile as modified in the entry for the tile of which the modified region is a member of in the storage buffer.

4. The method of claim 3, further comprising:

if the region was not written-to during the copying, marking the tile of which the region is a member of as unmodified in the entry for the region in the storage buffer.

5. The method of claim 1, wherein the method is performed for each of the plurality of regions in the frame buffer.

6. An apparatus comprising:

a frame buffer including a plurality of regions, each region including information for display on the display device;

a storage buffer including entries associated with the plurality of regions of a plurality of tiles of the frame buffer, wherein each region includes a plurality of pixels;

scan-out logic to refresh a display device, the scan-out logic to determine whether one region of the plurality of regions in a tile of the frame buffer has been modified, the determination to use data stored in at least one of the entries of the storage buffer, and if the one region has been modified, the scan-out logic to copy only the corresponding tile of the modified region from the frame buffer to the display device.

7. The apparatus of claim 6, wherein the entries of the storage buffer include information indicating whether the one region has been modified.

8. The apparatus of claim 6, wherein if the one region is not written-to while the one region is copied from the frame buffer to the display device, the scan-out logic to mark the region as modified in one of the entries of the storage buffer.

9. The apparatus of claim 6, wherein if the one region is not written-to while the one region is copied from the frame buffer to the display device, the scan-out logic to mark the region as unmodified in one of the entries of the storage buffer.

10. An system comprising:

a display device;

a processor;

a static random access memory unit (SRAM) coupled to the processor, the SRAM unit including, a frame buffer to include a plurality of tiles, each tile to include a plurality of regions, each region to include information for display on the display device;

a storage buffer to include entries associated with the plurality of tiles of the frame buffer;

scan-out logic to make determinations about whether the regions of tiles in the frame buffer have been modified, the determinations to use data stored in the entries of the storage buffer, and for regions that have been modified, the scan-out logic to copy the modified tiles from the frame buffer to the display device.

11. The system of claim 10, wherein the scan-out logic to copy the modified tiles from the frame buffer to the display device in sequential fashion.

12. The system of claim 10, the frame buffer to include a plurality of regions, each region to include one or more pixels.

13. The system claim 12, wherein some of the entries of the storage buffer include information for mapping pixels of the frame buffer to regions.

14. The system claim 10, wherein some of the entries of the storage buffer include information indicating whether the regions have been modified.

15. The system claim 10 further including a graphics engine to process a write command, the graphics engine to determine the region associated with the write command by interrogating an entry in the storage buffer.

* * * * *